Figure 1:
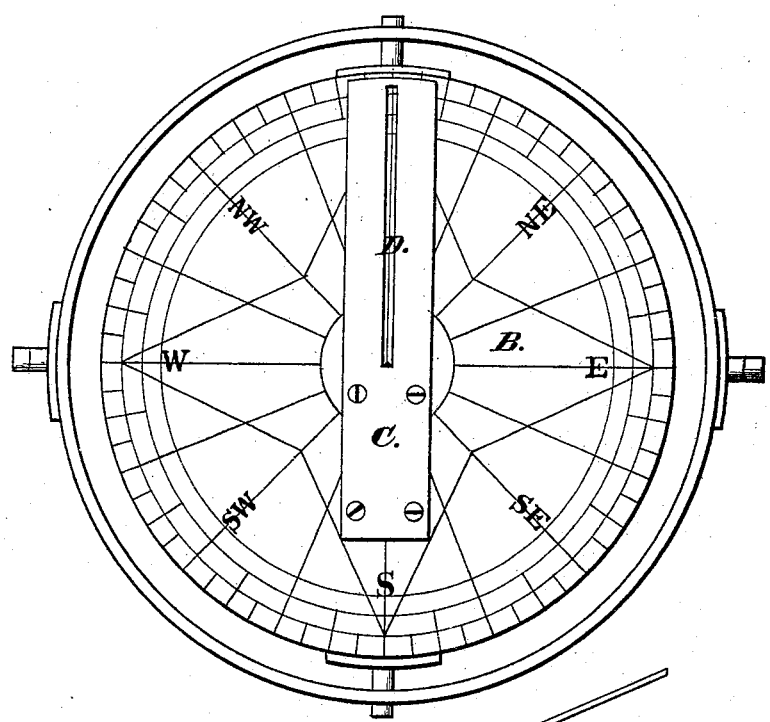
Figure 2:
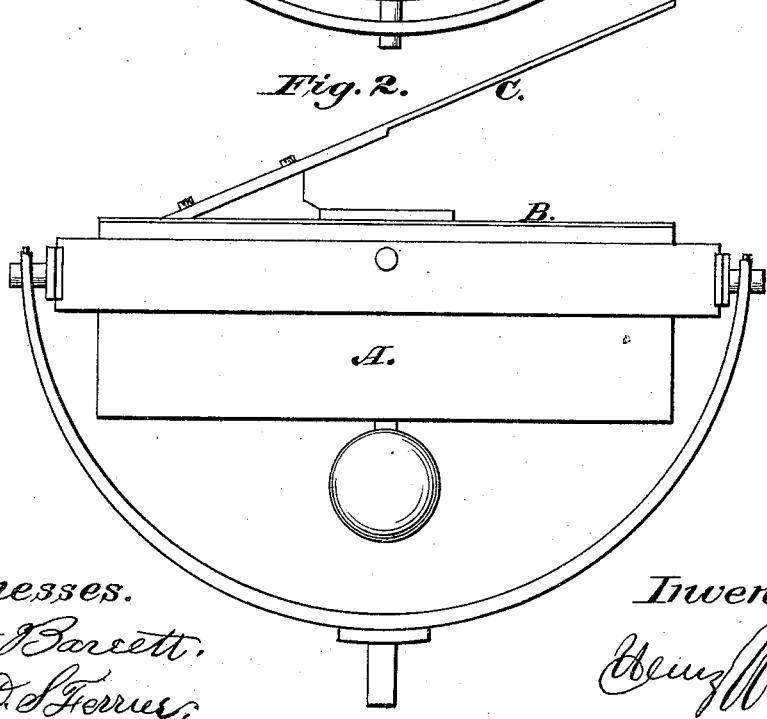

H. O. COOK.
Solar Compasses.

No. 141,766. Patented August 12, 1873.

Witnesses.
O. D. Barrett.
John D. S. Ferrier.

Inventor.
Henry Cook

UNITED STATES PATENT OFFICE.

HENRY O. COOK, OF NEW YORK, N. Y., ASSIGNOR TO MARINE VARIOMETER COMPANY, OF SAME PLACE.

IMPROVEMENT IN SOLAR COMPASSES.

Specification forming part of Letters Patent No. 141,766, dated August 12, 1873; application filed June 23, 1870.

*To all whom it may concern:*

Be it known that I, HENRY O. COOK, of New York, in the county and State of New York, have invented a certain new and useful improvement in an instrument for measuring the combined variation and deviation of compasses, and which I term a Compass Variometer, of which the following is a specification:

The object of my invention is to obtain the true north or south at sea, and from this determination to ascertain the variation and local attraction combined, of the ship's compass. It consists of a box, A, hung like a marine compass in gimbals, on the top of which box is a dial-plate, B, so arranged as to turn by the hand in a horizontal plane on the edge of the box A. The face of the dial has engraved on it the points of the compass like a regular marine compass-card. The box A is made very heavy below the joints on which it is hung, so that it may resist the rolling and pitching motion of the ship, and thereby keep the dial B constantly in a horizontal position. On the dial-plate B is placed a gnomon, C, meeting the dial at an angle of thirty-five degrees, more or less. The under side of the gnomon, for about half its length, is made to fit the dial, and is fastened to it by a screw passing through the center of the dial. By means of this screw the gnomon can be set to correspond with the south or the north point of the dial, it being desirable to have it at the south point when used in north latitude, and at the north point when used in south latitude. Through the upper half of the gnomon is a five-slot, D, for the rays of light to pass to the dial from the body (sun, moon, or star) from which the observation is taken. When the heavenly body observed is on the meridian, and the dial is so placed that the rays of light passing through the slot of the gnomon fall directly on the north and south line of the dial, it is plain that this line must be in the plane of the meridian of the place, and thus determines the true north and south of the place.

The exact time of the crossing of the meridian by the body observed is determined by the use of the sextant in the usual way.

As the wonderful perfection of the sextant now enables the skillful observer at sea, under ordinary circumstances, to determine the exact time of the crossing of the meridian within fifteen seconds, it is evident that the true north or south can be ascertained within four minutes or the one-fifteenth of a degree, since the sun moves through just four minutes or one-fifteenth of a degree in just sixteen seconds of time.

Having found the meridian of the place, the difference between this and the north and south of the ship's compass shows the variation of the compass.

One of the gimbal-joints on which the box A is hung may be used as the lubber's point of the compass.

If greater facility be required for determining the number of degrees through which the dial B is revolved, a pin may be attached to the said joint, and so bent as to bring its points directly over the degrees marked on the dial-plate.

Operation: Set the variometer with the compass to be tested, so that the north point on the variometer's dial, being at the lubber's point, shall coincide with the north, as indicated by the compass. Then, as the body observed crosses the meridian, turn with the hand the dial to the right or the left, as required, until the rays of light passing through the slot in the gnomon shall fall on the north and south line of the dial. Then the difference between the lubber's point and the north point of the variometer's dial shows the deviation of the compass without any calculation whatever.

What I claim as my invention, and desire to secure by Letters Patent, is—

The weighted box A, hung as described, the dial-plate B, and gnomon C, combined, when constructed and arranged as shown and set forth.

HENRY O. COOK.

Witnesses:
W. W. WALSH,
W. K. HALL.